(12) United States Patent
Hopkinson et al.

(10) Patent No.: US 12,138,599 B2
(45) Date of Patent: Nov. 12, 2024

(54) POROUS POLYBENZIMIDAZOLE MEMBRANE SUPPORTS FOR COMPOSITE MEMBRANES

(71) Applicant: Battelle Memorial Institute, Columbus, OH (US)

(72) Inventors: David Philip Hopkinson, Morgantown, WV (US); Lingxiang Zhu, Bethel Park, PA (US)

(73) Assignee: Battelle Memorial Institute, Columbus, OH (US)

( * ) Notice: Subject to any disclaimer, the term of this patent is extended or adjusted under 35 U.S.C. 154(b) by 417 days.

(21) Appl. No.: 17/378,632

(22) Filed: Jul. 16, 2021

(65) Prior Publication Data

US 2023/0024915 A1  Jan. 26, 2023

(51) Int. Cl.
| | |
|---|---|
| *B01D 53/22* | (2006.01) |
| *B01D 67/00* | (2006.01) |
| *B01D 69/02* | (2006.01) |
| *B01D 69/10* | (2006.01) |
| *B01D 69/12* | (2006.01) |
| *B01D 71/62* | (2006.01) |

(52) U.S. Cl.
CPC ........... *B01D 71/62* (2013.01); *B01D 53/228* (2013.01); *B01D 67/0013* (2013.01); *B01D 67/0016* (2013.01); *B01D 67/0095* (2013.01); *B01D 69/02* (2013.01); *B01D 69/105* (2013.01); *B01D 69/122* (2013.01); *B01D 2325/025* (2013.01); *B01D 2325/04* (2013.01); *B01D 2325/20* (2013.01)

(58) Field of Classification Search
CPC ............ B01D 67/0016; B01D 2325/20; B01D 69/122; B01D 67/0013; B01D 71/62; B01D 2325/04; B01D 53/22; B01D 53/228; B01D 67/0095; B01D 69/02; B01D 69/105; B01D 2325/025
See application file for complete search history.

(56) References Cited

U.S. PATENT DOCUMENTS

| | | | |
|---|---|---|---|
| 4,693,824 A | 9/1987 | Sansone | |
| 4,693,825 A * | 9/1987 | Trouw | B01D 67/0069 |
| | | | 210/500.28 |
| 5,091,087 A | 2/1992 | Calundann | |
| (Continued) | | | |

FOREIGN PATENT DOCUMENTS

CA          3086183 A1 *  6/2019  ........... B01D 61/025

OTHER PUBLICATIONS

Wu et al Journal of Membrane Science 565 (2018) 439-449, "Hydrophilic and morphological modification of nanoporous polyethersulfone substrates for composite membranes in CO2 separation".

(Continued)

*Primary Examiner* — Anthony R Shumate
(74) *Attorney, Agent, or Firm* — Susanne A. Wilson; Frank Rosenberg

(57) ABSTRACT

The present invention provides highly permeable and porous polybenzimidazole membranes, methods of making them, and their application as a high-performance membrane support for gas separation composite membranes. The polybenzimidazole membranes are bonded to a fabric substrate.

20 Claims, 6 Drawing Sheets

(56) References Cited

U.S. PATENT DOCUMENTS

| | | | | |
|---|---|---|---|---|
| 5,326,550 | A | * | 7/1994 | Adris ..................... B01J 8/0055 |
| | | | | 423/652 |
| 6,623,639 | B2 | | 9/2003 | Barss |
| 6,946,015 | B2 | | 9/2005 | Jorgensen |
| 10,328,396 | B2 | | 6/2019 | Livingston |
| 2006/0266696 | A1 | * | 11/2006 | Masuda ................. B01D 71/04 |
| | | | | 210/490 |
| 2009/0081518 | A1 | * | 3/2009 | Miyachi ................ B01D 71/68 |
| | | | | 429/490 |
| 2010/0196793 | A1 | * | 8/2010 | Besser ............... H01M 8/1079 |
| | | | | 429/479 |
| 2015/0306539 | A1 | * | 10/2015 | Yamato ............... H01M 50/414 |
| | | | | 210/490 |
| 2015/0376365 | A1 | * | 12/2015 | Halbach .................... C08J 9/28 |
| | | | | 521/64 |
| 2016/0220966 | A1 | * | 8/2016 | Kano .................... B01D 69/02 |
| 2016/0297172 | A1 | * | 10/2016 | Naruko .................. B32B 27/36 |
| 2017/0110749 | A1 | * | 4/2017 | Waller .................. H01M 8/103 |
| 2017/0239627 | A1 | * | 8/2017 | Weber ...................... A23L 2/74 |
| 2018/0257044 | A1 | * | 9/2018 | Gronwald .............. B01D 71/34 |
| 2018/0272286 | A1 | * | 9/2018 | Gronwald .............. B01D 69/02 |
| 2019/0001279 | A1 | * | 1/2019 | Scherzer ............. B01D 69/148 |
| 2020/0376442 | A1 | * | 12/2020 | Zheng .................. B01D 71/021 |
| 2021/0146312 | A1 | * | 5/2021 | Heijnen .................... B08B 3/08 |
| 2023/0201762 | A1 | * | 6/2023 | Okada ................. B01D 71/401 |
| | | | | 95/51 |

OTHER PUBLICATIONS

Wijmans & HAo, Journal of Membrane Science 494 (2015) 78-85 "Influence of the porous support on diffusion in composite membranes".

Scharnagl & Buschatz, Desalination 139(1) (2001) 191-198, "Polyacrylonitrile (PAN) membranes for ultra- and microfiltration".

Chung "A critical review of polybenzimidazoles" journal of macromolecular science Part C 37(2) (1997) 277-301.

Wijmans & Baker, Journal of Membrane Science 107 (1995) 1-21 "The solution-diffusion model: a review".

Li et al Journal of Membrane Science 461 (2014) 59-68 "Influence of polybenzimidazole main chain structure on H2/CO2 separation at elevated temperatures".

Berchtold et al Journal of Membrane Science 415-416 (2012) 265-270 "Polybenzimidazole composite membranes for high temperature synthesis gas separations".

Kumbharkar et al Journal of Membrane Science 375 (2011) 231-240 "High performance polybenzimidazole based asymmetric hollow fibre membranes for H2/CO2 separation".

Tashvigh, Akbar Asadi et al., Journal of Membrane Science 572 (2018) 580-587, "Robust polybenzimidazole (PBI) hollow fiber membranes for organic solvent nanofiltration".

GE Osmonics, The Filtration Spectrum, Minnetonka Nov. 2000 http:/osmonics.com/library/filspcold.html.

Wang et al. Journal of Membrane Science 281 (2006) 307-315, "Fabrication of polybenzimidazole (PBI) nanofiltration hollow fiber membranes for removal of chromate".

Wang et al., Indus. Eng. Chem. Res. 2007, 46, 5, 1572-1577, "Novel Polybenzimidazole (PBI) Nanofiltration Membranes for the Separation of Sulfate and Chromate from High Alkalinity Brine to Facilitate the Chlor-Alkali Process".

Wang et al. Journal of Membrane Science 300 (2007) 6-12, "Polybenzimidazole (PBI) nanofiltration hollow fiber membranes applied in forward osmosis process".

Valtcheva, Irina B. et al. Journal of Membrane Science 457 (2014) 62-72, "Beyond polyimide: Crosslinked polybenzimidazole membranes for organic solvent nanofiltration (OSN) in harsh environments".

Chen et al. Separation and Purification Technology 142 (2015) 299-306, "Solvent resistant nanofiltration membrane based on polybenzimidazole".

D. Y Takigawa, et al. Separation Science and Technology 27 (1992) 3, 325-339, "The Effect of Porous Support Composition and Operating Parameters on the Performance of Supported Liquid Membranes".

Weigelt et al. Membranes 9 (2019) 51, "Novel Polymeric Thin-Film Composite Membranes for High-Temperature Gas Separations".

Zhu et al. Industrial & Engineering Chemistry Research, 56, 1 (2016) 351-358, "Geometric Restriction of Gas Permeance in Ultrathin Film Composite Membranes Evaluated Using an Integrated Experimental and Modeling Approach".

R. Venkataraman et al., Materials Science and Engineering: A, 445-446 (2007) 269-274, Study on influence of porosity, pore size, spatial and topological distribution of pores on microhardness of as plasma sprayed ceramic coatings.

He, T. (2015). Finger-Like Structure. In: Drioli, E., Giorno, L. (eds) Encyclopedia of Membranes. Springer, Berlin, Heidelberg.

Nazri, A.I. et al., "Microcrystalline Cellulose-Blended Polyethersulfone Membranes for Enhanced Water Permeability and Humic Acid Removal", Membranes 2021, 11(9), 660.

\* cited by examiner

POROUS POLYBENZIMIDAZOLE MEMBRANE SUPPORTS FOR COMPOSITE MEMBRANES

GOVERNMENT RIGHTS CLAUSE

This invention was made with Government support from U.S. Department of Energy, National Energy Technology Laboratory including contract RSS contract 89243318CFE000003. The Government has certain rights in this invention.

INTRODUCTION

Membrane process represents an energy-efficient gas separation technology effectively competing with the conventional separation processes such as adsorption, absorption and cryogenic distillation. Today's industrial gas separation membranes often use thin film composite (TFC) membranes comprising a porous membrane support overlaid with a completely dense top layer of 0.1-1 μm, or a selective layer, as displayed in FIG. 1. The thin selective layer, or separation layer, is vulnerable and requires a porous membrane support to provide mechanical strength. Sometimes, a sub-micron highly permeable gutter layer as well as a sub-micron protective layer is required to improve membrane separation performance. A porous membrane support is typically made of a non-woven fabric (50-200 μm) and a porous polymer layer (about 10-100 μm) with surface nanopores. The gas separation performance of a TFC membrane is significantly affected by physicochemical properties and pore morphology of a porous support. Broad chemical resistance and good thermal stability are respectively required to accommodate aggressive solvent and heat conditions used to engineer thin separation layers from all kinds of membrane materials. An optimal porous support should possess high surface porosity and nano-sized pores to provide a smooth coating surface with minimal mass transfer resistance. Typically, the ideal pore diameter is in the range of 5 to 50 nm. Such pores allow fast transport of gas molecules across the membrane support and can also mitigate selective layer coating solution (or material) intrusion into the porous support. To quantitively characterize the surface pore size and porosity of a membrane support, a method integrating scanning electron microscopy (SEM) and SEM image processing is usually employed. For instance, Wu et al. (*Journal of Membrane Science* 565 (2018) 439-449440) used the method to determine the surface pore size and porosity of a series of nanoporous membrane supports made of modified polyethersulfone (PES), obtaining the pore size and porosity of 24.1-73.5 nm and 10-18.6%, respectively.

Current commercial porous membranes cannot meet all the requirements on physicochemical properties and pore morphology. More specifically, most today's gas separation TFC membranes adopt ultrafiltration (UF) membranes from liquid separation industry as porous membrane supports by taking advantage of their fine pores (10-100 nm). However, due to their limited surface porosity of about 10% or less, UF membranes can impose significant gas transport resistance and increases gas diffusion pathway through the thin separation layer. For example, a porous support with 10% porosity can still decrease gas permeance of a 100 nm-thick separation layer by as much as 31% (Wijmans and Hao, *Journal of Membrane Science* 494 (2015) 78-85). Another drawback of UF membrane based porous supports is their weak thermal and chemical stabilities. UF membranes are primarily designed for separating water from macromolecules and colloids, so their physicochemical properties are usually not adequate for gas separation membrane fabrications involving harsher solvent and thermal processes. For example, commercial UF membranes are mainly made from low-cost and low-permeability polymers like polyethersulfone (PES), polysulfone (PSF), polyvinylidene fluoride (PVDF), and polyacrylonitrile (PAN). PES, PSF, and PVDF UF membranes have poor chemical resistance to solvents like acetone, toluene, tetrahydrofuran (THF), and chloroform that are commonly used to form coating solutions. PAN UF membranes can be resistant to most common organic solvents but their thermal stability remains problematic due to PAN's low glass transition temperature ($T_g$) of about 87° C. (Scharnagl and Buschatz, *Desalination* 139(1) (2001) 191-198.) Porous structure of PAN membranes is subject to deformation or shrinkage if they are heated to or above $T_g$.

Polybenzimidazole (PBI), or poly(2,2'-(m-phenylene)-5,5'-bisbenzimidazole), is a commercial polymer only soluble in a few aprotic polar solvents like dimethylacetamide (DMAc). Unless specified otherwise, PBI represents poly(2,2'-(m-phenylene)-5,5'-bisbenzimidazole) in this invention disclosure. In addition to the broad chemical resistance, PBI has exceptional thermal stability with $T_g$ of 427° C. and does not decompose until 600° C. (Chung, "A critical review of polybenzimidazoles", *Journal of Macromolecular Science*, Part C 37(2) (1997) 277-301.). Due to the excellent chemical and thermal stabilities, PBI finds itself in numerous membrane separation applications, mainly for gas separation (primarily $H_2/CO_2$ separation) and nanofiltration, and often for ultrafiltration and porous membrane supports. Examples for each type of application are given in the following.

First, nonporous PBI membranes have been reported for high-temperature gas separations in numerous publications or patents. In those membranes, no surface pores can be observed on PBI under SEM, and PBI serves as a selective material that separates gas mixtures following a solution-diffusion mechanism (Wijmans and Baker, *Journal of Membrane Science* 107 (1995) 1-21). According to the mechanism, gas molecules first dissolve into the upstream side of a nonporous membrane, diffuse through the membrane, and then desorb at the downstream side. Nonporous membranes separate gas A from gas B because A is more soluble or diffusive in the nonporous material than B. For example, Li, in (2014) doctoral dissertation "Structure-Property Relationships in Polybenzimidazole Materials for Gas Separation and Fuel Cell Applications", provides a review of prior work. Li et al. in *Journal of Membrane Science* 461 (2014) 59-68, "Influence of polybenzimidazole main chain structure on $H_2/CO_2$ separation at elevated temperatures." reported a study of cast films of four PBI derivatives. Gas permeation properties of these PBI films were evaluated at elevated temperatures (up to 250° C.) and pressures (up to 50 psia) and it was found that the main chain structural variations effectively disrupted the PBI chain packing resulting in film $H_2$ permeability (up to 997.2 barrer) compared with PBI (76.81 barrer) at 250° C. and 50 psia. However, lower $H_2/CO_2$ selectivities (5-7 (modified PBIs) versus 23 (PBI)) were also measured and reflected the general trade-off between gas permeability and selectivity. Berchtold et al., in *Journal of Membrane Science* 415-416 (2012) 265-270, "Polybenzimidazole composite membranes for high temperature synthesis gas separations." described a PBI/stainless steel composite membrane for syngas separations at elevated temperatures. Measured at 250° C., $H_2$ permeance of 7 gas permeation units (with an estimated permeability of 88 barrer) and $H_2/CO_2$ selectivity of 47 were reported. Kumbharkar et al., in *Journal of Membrane Science* 375 (2011) 231-240, "High performance polybenzimidazole based asymmetric hollow fiber membranes for $H_2/CO_2$ separation", describes using PBI hollow fiber membrane with a nonporous surface layer for $H_2/CO_2$ separation at 100-400° C., and the best separation performance was achieved at 400° C. with a $H_2$ permeance of about $2.6 \times 10^{-6}$ $cm^3(STP)/cm^2 s\ cmHg$ and $H_2/CO_2$ selectivity of about 27. Jorgensen et al., in U.S. Pat. No. 6,946,015 "Cross-linked polybenzimidazole membrane for gas separation", describes applying cross-linked PBI coating on a metal or ceramic porous support to achieve enhanced $H_2$ permeability compared to the non-cross-linked PBI at temperatures over 265° C. for $H_2/CO_2$ separation. These nonporous PBI membranes cannot be used in a membrane support application due to its extremely high mass transfer resistance.

Second, PBI has also been fabricated into nanofiltration (NF) membranes for the filtrations of aqueous fluids and organic solvents. NF membranes are porous, typically with pore size about 1 nm or less, but their pores can hardly be observed or measured by SEM due to the limited SEM imaging resolution (>2 nm) (*Micron* 38 (2007) 390-401). Instead, NF membranes' pore size is usually determined using a solute rejection method, in which a series of small molecules (solutes) with known molecular weight are employed to probe the pore size in a filtration test (*Journal of Membrane Science* 572 (2019) 580-587). As such, the pore size of a NF membrane is characterized by molecular weight cut-off (MWCO), which is defined as the molecular weight of a molecule that would exhibit a rejection of 90% when subjected to filtration by the membrane. For example, pore size of 0.5 and 1 nm correspond to MWCO of 100 and 200 Dalton, respectively (GE Osmonics, The Filtration Spectrum, Minnetonka, Minn., November 2000). PBI-based nanofiltration membranes with sub-1 nm pores have been reported in many publications and patents: 1) Wang et al. in Fabrication of polybenzimidazole (PBI) nanofiltration hollow fiber membranes for removal of chromate, *Journal of Membrane Science* 281 (2006) 307-315 and Novel Polybenzimidazole (PBI) Nanofiltration Membranes for the Separation of Sulfate and Chromate from High Alkalinity Brine to Facilitate the Chlor-Alkali Process. 2) Indus. Eng. Chem. Res. 2007, 46, 5, 1572-1577 described hollow fiber membranes prepared via a phase inversion method using a water coagulation bath at 26° C. The membrane pore size was about 0.7 nm in diameter. 3) Wang et al. in Polybenzimidazole (PBI) nanofiltration hollow fiber membranes applied in forward osmosis process, Journal of Membrane Science 300 (2007) 6-12 reported the application of PBI nanofiltration hollow fiber membranes in forward osmosis. The hollow fiber membranes were prepared via a phase inversion method, and their pore size was about 0.64 nm in diameter. 4) Valtcheva et al. in Beyond polyimide: Crosslinked polybenzimidazole membranes for organic solvent nanofiltration (OSN) in harsh environments. J. Mem. Sci. 457 (2014) 62-72 described making flat-sheet PBI nanofiltration membranes via phase inversion, followed by a chemical crosslinking treatment. The resulting membranes were used for organic solvent nanofiltration. 5) Similarly, Chet et al. in Solvent resistant nanofiltration membrane based on polybenzimidazole, Separation and Purification Technology 142 (2015) 299-306, flat-sheet PBI nanofiltration membranes were prepared via phase inversion, and the resulting membranes were directly used as organic solvent nanofiltration. The resulting NF membranes showed MWCO of 160 Dalton. 6) Tashvigh et al. in Robust polybenzimidazole (PBI) hollow fiber membranes for organic solvent nanofiltration, Journal of Membrane Science 572 (2019) 580-587 described PBI hollow fiber nanofiltration membranes prepared via phase inversion, followed by an acid doping treatment to improve the chemical stability. The resulting membranes were used for organic solvent nanofiltration. 7) In U.S. Pat. No. 10,328,396, nanofiltration membranes were formed from polybenzimidazole solution by phase inversion and were then crosslinked by addition of crosslinking agents. In this process, the PBI solution was allowed to evaporate over a long evaporation period (~30 seconds) before immersing the film cast on the substrate into a coagulating medium, forming a top skin layer with surface pore size with MWCO of 236-396 Dalton, which is equivalent to about 1 nm. These PBI nanofiltration membranes also cannot be used in membrane support applications due to their tiny pores and high mass transfer resistance.

Third, there are several other patents describing inventions involving porous PBI membranes for the applications like ultrafiltration. U.S. Pat. No. 4,693,824 described a phase inversion process of the preparation of ultrafiltration PBI membranes in a coagulation bath comprised of a solvent and a non-solvent (water). In this process, the water content varied in the range of 15 to 99.5 weight % and the coagulation bath temperature was set at 0-40° C., preferably about 20° to 25° C. U.S. Pat. No. 5,091,087 described coating a polybenzimidazole powder with another polymer and compression molding the coated particles at a temperature in the approximate range of 435°-450° C. to form a membrane. The guest polymer was then extracted from the sheet, leaving a fine, uniform, polybenzimidazole microporous structure with pore size 200-700 nm. U.S. Pat. No. 6,623,639 describes a method of making a PBI microporous hollow fiber membrane via phase inversion method. The PBI microporous hollow fibers with pore size of 50-1000 nm are useful for ultrafiltration, microfiltration, and membrane contactors.

Lastly, PBI porous membranes have also been developed as a porous membrane support for composite membranes. D. Y. Takigawa in the Effect of Porous Support Composition and Operating Parameters on the Performance of Supported Liquid Membranes. *Separation Sci. and Tech.*, 27. 3, 325-339 (1992) describes preparing a porous PBI membrane via a phase inversion process in a cold (7° C.) coagulation bath containing 30% water and 70% N-methylpyrrolidone by weight. Weigelt et al., Membranes 9 (2019) 51, "Novel Polymeric Thin-Film Composite Membranes for High-Temperature Gas Separations" reported the fabrication of flat-sheet porous PBI membrane via a phase inversion process using pore formers (PEG2000) and a room-temperature (~20° C.) water bath. The porous PBI membrane with surface porosity of 21% and pore size of about 100 nm was applied as a membrane support in gas separation composite membranes.

However, existing porous PBI membranes do not have suitable pore structures for membrane support application. Specifically, the PBI membranes with large surface pores (>50 nm) may lead to severe pore penetration or defects when they are applied with thin film coatings. Those reported PBI nanofiltration membranes characterized with small pores (1 nm or less) present significant mass transfer resistance.

SUMMARY OF THE INVENTION

In a first aspect, the invention provides a method of making a flat sheet of a membrane suitable for membrane support, comprising: providing a fabric sheet; applying a coating solution to the fabric sheet; wherein the solution comprises a polybenzimidazole in an aprotic polar solvent to form a PBI-coated fabric; passing the PBI-coated fabric into an aqueous coagulation bath to form a porous PBI coated composite wherein the coagulation bath is at a temperature of at least 45° C.; and rinsing and drying the porous PBI composite.

Methods of the invention may include one or any combination of the following: wherein the fabric is a non-woven fabric; wherein the solvent is DMAc; wherein the membrane is produced in a roll-to-roll process; wherein the coating solution is applied to the fabric by knife casting; comprising an evaporation period of 3 to 15 seconds, or 4 to 10 seconds, or 10 to 60 seconds prior to immersing in the coagulation bath; wherein the coating is applied to a thickness of 20 to 500 µm, such as by setting a 20 to 500 µm gap during knife casting; wherein the coating solution comprises at least 8 wt %, or at least 15 wt %, or 8 to 25 wt % of a PBI; wherein the PBI has an R group selected from the group consisting of p-phenylene, pyridine, diphenyl sulfone, 6F, BTBP, PFCB, phenylindane, and combinations thereof; wherein the aprotic solvent is selected from the group consisting of N,N-dimethyl formamide, dimethyl sulfoxide, N-methyl-2-pyrrolidone, and combinations thereof; wherein the non-woven fabric comprises a polyphenylene sulfide non-woven fabric; wherein the non-woven fabric is selected from polyester, polyethylene, polypropylene, or polyetherether ketone non-woven fabrics; wherein the solution and/or other components consist essentially of no pore forming additives; wherein the porous membranes have a surface porosity at least 3%, or at least 5%, or at least 10%, or at least 20% (as explained below, surface porosity can be measured using a scanning electron microscope, followed by an imaging processing; the magnification of the microscope is at least 100,000 times, preferably in a range of 200,000 to 400,000 times); wherein the porous membranes have 98% of the pores by number are less than 50 nm in diameter, or less than 40 nm in diameter, or less than 20 nm in diameter, or less than 15 nm in diameter, when tested under a scanning electron microscope, followed by an imaging processing (as explained below); wherein the porous membranes have a $CO_2$ permeance of greater than 4 kGPU (1 kGPU=1000 GPU, 1 GPU=3.347×10$^{-10}$ mol m$^{-2}$s$^{-1}$Pa$^{-1}$) or greater than 7 kGPU or greater than 26 kGPU or greater than 85 kGPU or greater than 171 kGPU or greater than 260 kGPU.

The invention also includes a porous PBI membrane support or a porous PBI membrane supported composite membrane made by any of the methods described here.

In another aspect, the invention provides a porous PBI membrane, comprising: a fabric layer; a PBI layer bonded to the fabric layer; and further characterizable by:
a) wherein the porous PBI membrane comprises a $CO_2$ permeance in the range of 50 to 260 kGPU, or 20 to 50 kGPU, or 100 to 400 kGPU, or a $N_2$ permeance in the range of 50 to 300 kGPU, or 20 to 50 kGPU, or 100 to 500 kGPU, preferably a gas ($CO_2$ or $N_2$) permeance of at least 200 kGPU; b) wherein the PBI layer comprises a pore size of less than 50 nm, and a surface porosity of at least 8%; or c) wherein the PBI layer comprises finger-like pores observed from the cross-section under microscope, and wherein at least 50 vol % of the pores in the PBI layer have an aspect ratio of at least 2 (or at least 3 or at least 5), wherein aspect ratio is defined as maximum length divided by average width (diameter) of each pore, and where length is perpendicular to the surface of the fabric layer.

Membranes of the present invention can be further described by one or any combination of the following features: wherein the PBI layer has a pore diameter of 20 nm or less; wherein the PBI layer has a surface porosity of at least 5%; wherein the PBI layer has a heat resistance such that, if annealed to 200° C., the membrane comprises a $CO_2$ permeance of at least 150 kGPU; wherein the PBI layer has a solvent resistance such that, if soaked in chloroform, tetrahydrofuran, or acetone for 1 hour, the soaked and then dried membrane comprises a gas permeance at least 90% its permeance measured before the solvent soaking; further comprising a top layer coated on the PBI layer so that the porous PBI layer is sandwiched between the fabric layer and top layer; wherein the top layer is made from at least one material showing selective permeability to gas A over gas B, for example, $CO_2$/nitrogen, $CO_2$/methane, hydrogen/$CO_2$; wherein the top layer is be polymeric, for example, may comprise PDMS, or polymer/inorganic hybrid materials; wherein the top layer comprises inorganic materials, for example, graphene oxides, metal-organic frameworks, and molybdenum disulfide, or combinations thereof; wherein the top layer comprises a single layer made of selective coating materials or plural layers with the sub-layers including a selective layer, an optional gutter layer or an optional protective layer; wherein the top layer comprises a gutter layer disposed between the PBI layer and the selective layer (in some preferred embodiments, the gutter layer comprises PDMS: wherein the gutter layer comprises a PDMS/metal-organic framework hybrid, or amorphous fluoropolymer such as Teflon™; wherein the top layer comprises a thin coating of one material, or two or more materials; wherein the top layer has an overall thickness of less than 1 µm, or 0.1 to 1 µm; wherein a porous PBI membrane supported composite membrane or a composite membrane intermediate comprises a top layer of polydimethylsiloxane attached to the PBI layer; wherein the composite membrane of has a $CO_2$ selective top layer and wherein the composite membrane has a $CO_2$ permeance of at least 1000 GPU or at least 3000 GPU and a $CO_2/N_2$ selectivity of least 8 or at least 25 at 25° C. and feed pressure of 1 atm; wherein the porous PBI membrane supported composite membrane comprises a $CO_2$ selective layer, wherein the $CO_2$ selective layer has a thickness in the range of 100 to 500 nm and wherein the composite membrane has a membrane permeance efficiency (β, as explained below) of 39 to 64%, or at least 10%; wherein the porous PBI membrane supported composite membrane comprises the $CO_2$ selective layer, wherein the $CO_2$ selective layer comprises poly(ethylene oxide terephthalate)-poly(butylene terephthalate).

The invention also includes a porous PBI membrane supported composite membrane comprising a $CO_2$ selective layer, comprising a $CO_2$ permeance as a function of the thickness of the $CO_2$ selective layer of about 12.6 kGPU at a $CO_2$ selective layer thickness of 100 nm to about 5000 GPU at a $CO_2$ selective layer thickness of 450 nm or any value along a line between these points. The term "about" encompasses the data point 2 in FIG. 6 but less scope (+/−) than to overlap the PAN data in the figure.

In a further aspect, the invention provides a method of separating a component of a fluid mixture, comprising passing the fluid mixture in contact with any of the membranes described herein. In some embodiments, the fluid mixture is a gaseous mixture comprising at least 3 vol % (or at least 10 vol % or at least 20 vol %) $CO_2$, or nitrogen, or methane, or hydrogen.

The invention may comprise any of the materials, conditions, properties, or other features mentioned herein.

FEATURES AND ADVANTAGES OF THE INVENTION

One feature of our invention is the use of a traditional and facile phase inversion technique to prepare porous PBI membranes with high gas permeance ($CO_2$: 260 kGPU; $N_2$ 300 kGPU), preferred pore size (<42 nm and ≥5 nm) and high surface porosity (>10%), which are desired features for a membrane support used in gas separation membranes. Compared to the existing approaches, this invention may include the following features/advantages:

a. Improved surface pores: Unlike conventional porous PBI membranes (typically having a pore size of 1 nm or less for nanofiltration membranes, or >50 nm for microporous membranes used for ultrafiltration and general filters) reported in the prior patents and literature (as summarized in Table 4), the porous PBI membranes in this invention preferably have pore size of 42 nm or less but greater than or equal to 5 nm. This surface pore size range is beneficial to the formation of a low defect, permeable thin films useful as a porous support for a gas separation membrane. Surface pores larger than 50 nm may lead to severe pore penetration and defects. On the other hand, PBI nanofiltration membrane with tiny pores (typically 1 nm in diameter or less) have significant mass transfer resistance.

b. Elevated water quench bath temperature (60° C.): In our invention, an elevated water bath temperature of 45° C. or higher, or 50 or 55° C. or greater, or 45 to 80° C., preferably about 60° C. is preferably used to promote pore formation during the phase inversion process.

c. No pore formers (or additives) used (i.e., minimized waste treatment cost): In this invention, the polymer solution may consist only of PBI and DMAc solvent, so the generated waste water (from water quench bath) only contains DMAc contaminant. Prior approaches employed many additives such as short-chain polymers, long-chain polymers (e.g., polyvinylpyrrolidone) and salt (e.g., lithium chloride), which would eventually go into a water quench bath. As a result, the treatment of waste from our invention is much simpler than that in existing approaches. Thus, in preferred embodiments, no pore formers are used.

d. This invention employs a phase inversion method that can be easily scaled up in a traditional roll-to-roll manufacturing.

e. When a PDMS layer is applied to the top of the invented PBI membrane support to form a thin-film composite membrane, the highest ratio (i.e., 126 GPU/nm) of CO2 permeance (i.e., 12600 GPU) to PDMS thickness (i.e., 100 nm) was achieved compared with other references. The ratio of CO2 permeance to PDMS thickness is a common performance benchmark for gas separation membrane supports, and a higher ratio demonstrates better support performance.

f. High membrane permeance efficiency for thin film composite membrane with a top layer thickness of 100-210 nm. The membrane permeance efficiency is a ratio of experimental gas permeance to ideal gas permeance across a composite membrane. The efficiency is another performance benchmark for gas separation membrane supports though it is a top layer thickness dependent parameter, and a higher membrane permeance efficiency means better support performance. In this invention, when a PDMS layer of 100-210 nm thick is applied to the PBI porous membrane support to form thin-film composite membranes, the resulting composite membranes have membrane permeance efficiency of 39.4-59.1%, compared to 14.4-37.5% observed on other reported PDMS/commercial membrane support composite membranes in the literature. This comparison reconfirms that the invented PBI supports outperform other commercial porous supports, by approximately doubling the permeance efficiency in most cases.

GLOSSARY

"Composite membrane" refers to a membrane comprised of a porous support overlaid with at least a selective layer. As depicted in FIG. 1, when the selective layer thickness is 1 micron or thinner, the composite membrane can be called as a 'thin-film composite (TFC) membrane.

Pore size and Porosity Determination: In this invention, membrane surface pore size and porosity are determined by a widely-used SEM imaging processing method (*Industrial & Engineering Chemistry Research*, 56 (2017) 351-358, *Materials Science and Engineering: A*, 445-446 (2007) 269-274, and *Journal of Membrane Science* 565 (2018) 439-449440). First, high-resolution (preferably at 200,000 times magnification) SEM images of support membranes are taken by a scanning electron microscope (FEI Scios™ DualBeam system, Thermo Fisher Scientific, OR, USA). To eliminate charging during SEM imaging, samples are coated with a 1.3 nm-thick gold-palladium alloy by sputter coating (EMS 150TES, Quorum Technologies, East Sussex, UK). The resulting representative surface SEM images are displayed in FIG. 3*a-f*. Second, ImageJ, an open-source image processing program (https://imagej.nih.gov/ij/https://imagej.nih.gov/ij/, accessed on Jun. 25, 2021), is employed to convert the surface SEM images to 8-bit binary images, and 'Adjust Brightness/Contrast' and 'Adjust Threshold' features were then used to designate pores and non-pores as shown in the FIG. 4. Finally, 'Analyze Particles' function of ImageJ is applied to estimate the surface porosity and pore size range via counting the number of image pixels designated as pore regions. At the magnification of 200,000 times, one pixel in the SEM image represents 1.4 nm in dimensions, and 1×1 pixel represents 2.0 nm² in area. Any single designated pore with an area greater than 9 pixels (equivalent to a pore diameter of 5 nm) is considered as a measurable pore as this size is the smallest pore distinguishable under the SEM. The surface porosity (%) is defined as the pore area divided by the total image area. The average pore diameter of the 2% largest pores (by number) is set as the upper limit of the pore size range, that is, 98% of the pores (by number) are smaller than the determined upper limit. The lower limit of the reported pore size range is 5 nm, which is also the lower limit of detection of the used method.

Gas Permeance Measurement: Pure-gas permeances of $CO_2$ and $N_2$ across membrane samples are determined using a constant pressure/variable volume apparatus at 25° C., and calculated using:

$$(P_A/l)_{exp} = \frac{J_A}{A \cdot (p_f - p_p)} \times \frac{273}{T} \quad (1)$$

where $(P_A/l)_{exp}$ is the experimentally determined permeance of gas component A, $J_A$ (cm³/s) is steady-state volumetric flow rate of permeate gas, A (cm²) is effective sample area, and T (K) is temperature. The pressure difference between feed and permeate ($p_f$-$p_p$) is set at 1 bar. The steady-state volumetric flow less than 20 (STP) cm$^3$/min was measured using a mass flow meter (Alicat Scientific, AZ, USA), and high flow rate (>20 (STP) cm$^3$/min) is determined by a soap flow meter (Hewlett-Packard, CA, USA).

Polymers: polybenzimidazoles are a class of heterocyclic aromatic polymers comprising recurring units of a benzimidazole and a R group as shown in FIG. 10. Celazole® PBI used in our examples is one of them, and it carries a R group of m-phenylene. Other PBIs with good chemical/thermal stabilities can potentially be used, and they may include a R group such as p-phenylene, pyridine, diphenyl sulfone, 6F, BTBP, PFCB, and phenylindane, as shown in FIG. 10.

Solvents: Besides N,N-dimethylacetamide (DMAc), other aprotic polar solvents that are able to dissolve PBI to form solutions with PBI content no less than 10 wt % can be used as an alternative and/or additional solvent. N,N-dimethyl formamide, dimethyl sulfoxide, and/or N-methyl-2-prrolidone are examples.

Substrates: Besides polyphenylene sulfide non-woven fabrics, non-woven fabrics can be made of other polymers such as, but not limited to, polyester, polyethylene, polypropylene, and/or polyetherether ketone (PEEK), can be used as the substrate.

The invention is typically defined using the term "comprising" meaning "including;" however, any of the inventive aspects can alternatively be described using the narrower terms "consisting essentially of" or "consisting of" to exclude components that would materially affect the invention or exclude other components, respectively.

DETAILED DESCRIPTION OF THE INVENTION

Example 1: Porous PBI Membrane Supports

Figure 1:
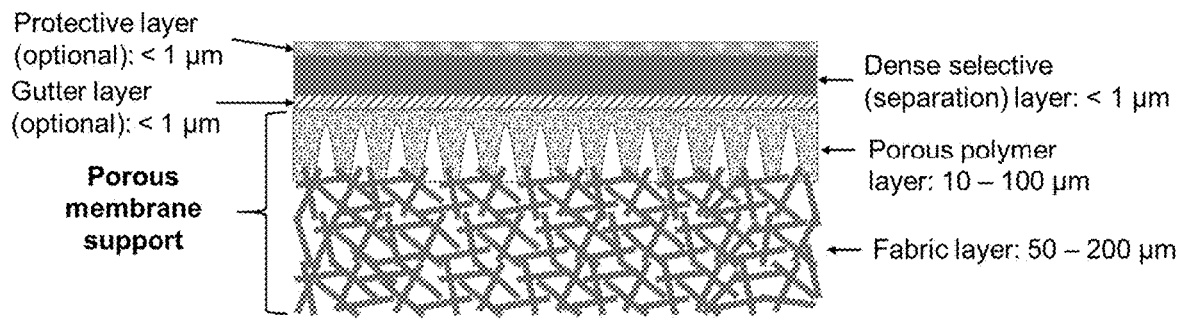
FIG. 1 Prior Art. Schematic illustration of a thin film composite (TFC) membrane comprised of a porous membrane support providing mechanical reinforcement and a dense selective layer performing gas separation. The membrane support consists of a porous polymer layer and a non-woven fabric layer. An optional gutter layer and an optional protective layer are sometimes required to improve membrane separation performance.
Figure 2:
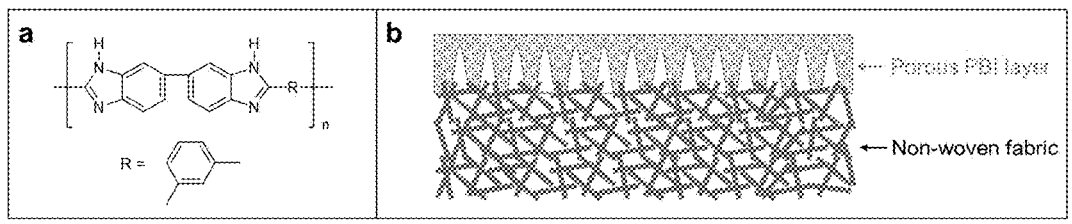
FIG. 2. (a) Repeating unit of PBI or poly(2,2'-(m-phenylene)-5,5'-bisbenzimidazole). Illustrations of (b) a porous PBI membrane comprised of a porous PBI layer and a non-woven fabric substrate and (c) a general procedure to prepare a porous PBI membrane.
Figure 2:
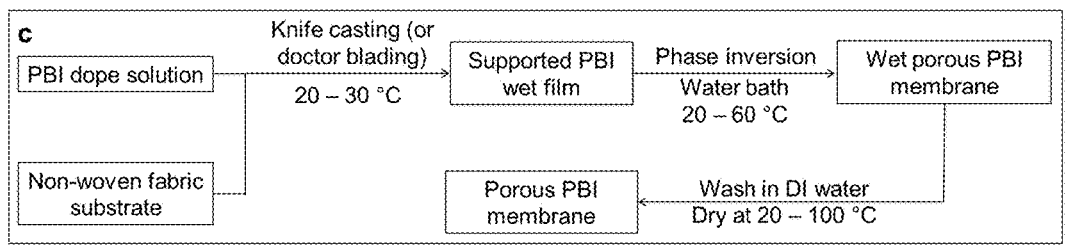

The present invention provides a facile and scalable method to prepare flat-sheet porous PBI membranes for membrane support application in TFC membranes. PBI is used as a membrane material due to its exceptional chemical and thermal stability. FIG. 2a shows the chemical structure of Celazole® PBI (poly(2,2'-(m-phenylene)-5,5'-bisbenzimidazole)), which is commercially available in forms of powder and solution. The invented porous PBI membranes comprise a non-woven fabric and a porous PBI layer as shown in FIG. 2b. The non-woven fabric provides mechanical support as well as allows the realization of continuous production in a roll-to-roll process. A chemical/thermal-resistant polyphenylene sulfide (PPS) non-woven fabric is used as the substrate in this invention. A phase inversion method is employed to fabricate porous PBI membranes. The phase inversion method involving polymer precipitation by water is the most important technique to prepare microporous membranes in both laboratory and industry. In this process, a liquid polymer solution is precipitated into two phases: a polymer-rich phase that forms the matrix of the membrane and a polymer-lean phase that forms the membrane pores.

a. Membrane Fabrication and Characterization

Figure 5:
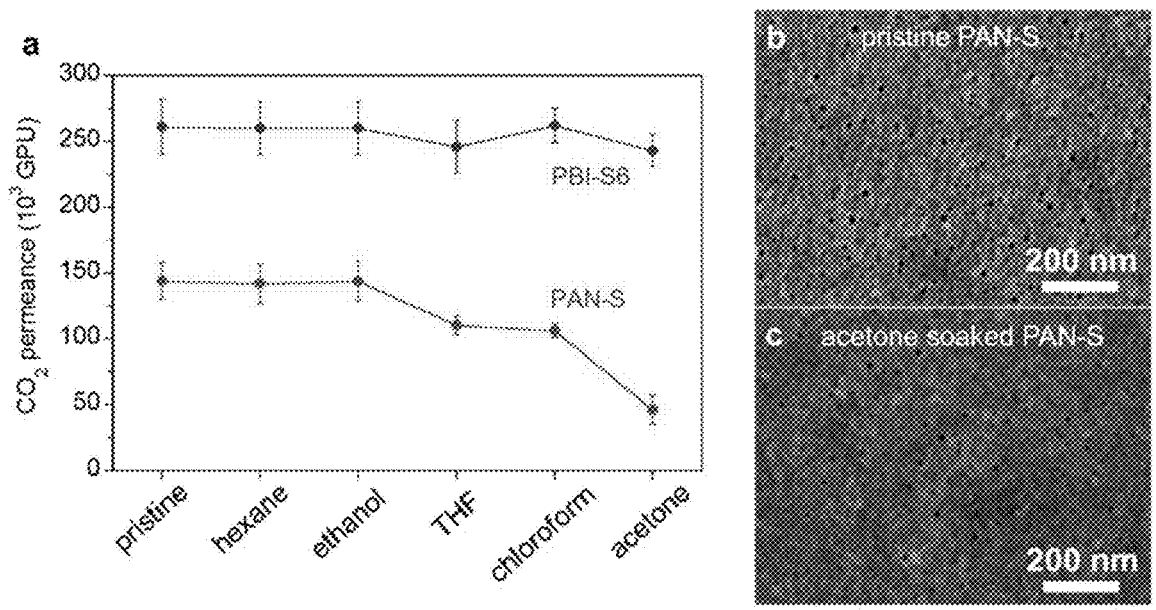
FIG. 5 (a) Effect of solvent soaking on $CO_2$ permeance of PBI-S6 and a commercial porous support (PAN-S). Surface morphology of PAN-S before (b) and after (c) soaking in acetone for 1 hour.

Membrane Fabrication: As displayed in FIG. 2c, porous PBI membranes are prepared in the following steps. A PBI solution at a desirable concentration was firstly cast on PPS non-woven fabrics using a casting knife with a gap setting of 150 μm and a knife speed of 4 cm s$^{-1}$ at 20-23° C. and relative humidity of 60% (the ambient condition at our laboratory). An evaporation period of 5 seconds was allowed before immersing the PBI/PPS non-woven fabrics into a water quench bath set at a given temperature (20-60° C.). After 1 hour, the resulting membrane was rinsed twice using deionized water to remove residual dimethylacetamide (DMAc). The PBI membrane was finally obtained after drying at 23° C. in a fume hood for 24 hours. Water quench bath temperature and PBI solution concentration were varied to achieve different pore structures in this invention. Table 1 summarizes sample identifications, and their fabrication conditions including PBI solution property and water bath temperature. Solution casting of a polymer on a non-woven fabric requires a sufficient viscosity to prevent solution penetration to the backside of the fabric. The viscosity of a polymer solution is tied to the polymer concentration, and it decreases when the solution is diluted. The viscosities of PBI solutions were determined using an Anton Paar MCR 302 rheometer at a 50 mm-diameter cone/plate sample stage with a 1 mm sample gap in a rotational mode at a shear rate of 0.1-100 s$^{-1}$ and 25° C. The obtained viscosities are summarized in Table 1. For example, 15 wt. % PBI has a viscosity of 1450±13 cP at 25° C., compared with 260±20 cP for 10 wt. % PBI. The selected PPS non-woven fabric can hold PBI solution as dilute as 10 wt. %.

their gas permeance before and after soaking in a solvent for 1 hour. This treatment simulates the solvent exposure history of a support when applied with a coating solution during the TFC membrane manufacturing. Prior to gas permeation tests on soaked samples, solvent was slowly evaporated in a fume hood for 2 hours, followed by vacuuming for 16 hours to completely remove the solvent at 23° C. In this evaluation, a commercial polyacrylonitrile porous support (PAN-S) was selected as a benchmark because it is among the most chemically stable porous supports available in the market. FIG. 5a shows that $CO_2$ permeance of PBI-S6 was slightly affected by the common solvents used for thin film coating,

TABLE 1

Porous PBI membrane fabrication conditions and characterizations.

| Sample ID | PBI (wt. %) | DMAc (wt. %) | Viscosity (25° C., cP) | Water bath temp. (° C.) | $CO_2$ permeance (kGPU) | Pore size range* (dia., nm) | Surface porosity (%) |
|---|---|---|---|---|---|---|---|
| PBI-S1 | 15.0 | 85.0 | 1450 ± 13 | 20 | 3.8 ± 0.6 | 5-13 | 2.8 ± 0.5 |
| PBI-S2 | 15.0 | 85.0 | 1450 ± 13 | 40 | 7.3 ± 1.0 | 5-15 | 4.2 ± 0.6 |
| PBI-S3 | 15.0 | 85.0 | 1450 ± 13 | 60 | 26 ± 3 | 5-18 | 6.2 ± 0.9 |
| PBI-S4 | 12.5 | 87.5 | 820 ± 4 | 60 | 85 ± 7 | 5-25 | 8.6 ± 1.0 |
| PBI-S5 | 11.0 | 89.0 | 440 ± 3 | 60 | 171 ± 12 | 5-33 | 13 ± 2 |
| PBI-S6 | 10.0 | 90.0 | 286 ± 2 | 60 | 260 ± 20 | 5-42 | 20 ± 2 |

*98% of the surface pores are within the range.

Figure 3:
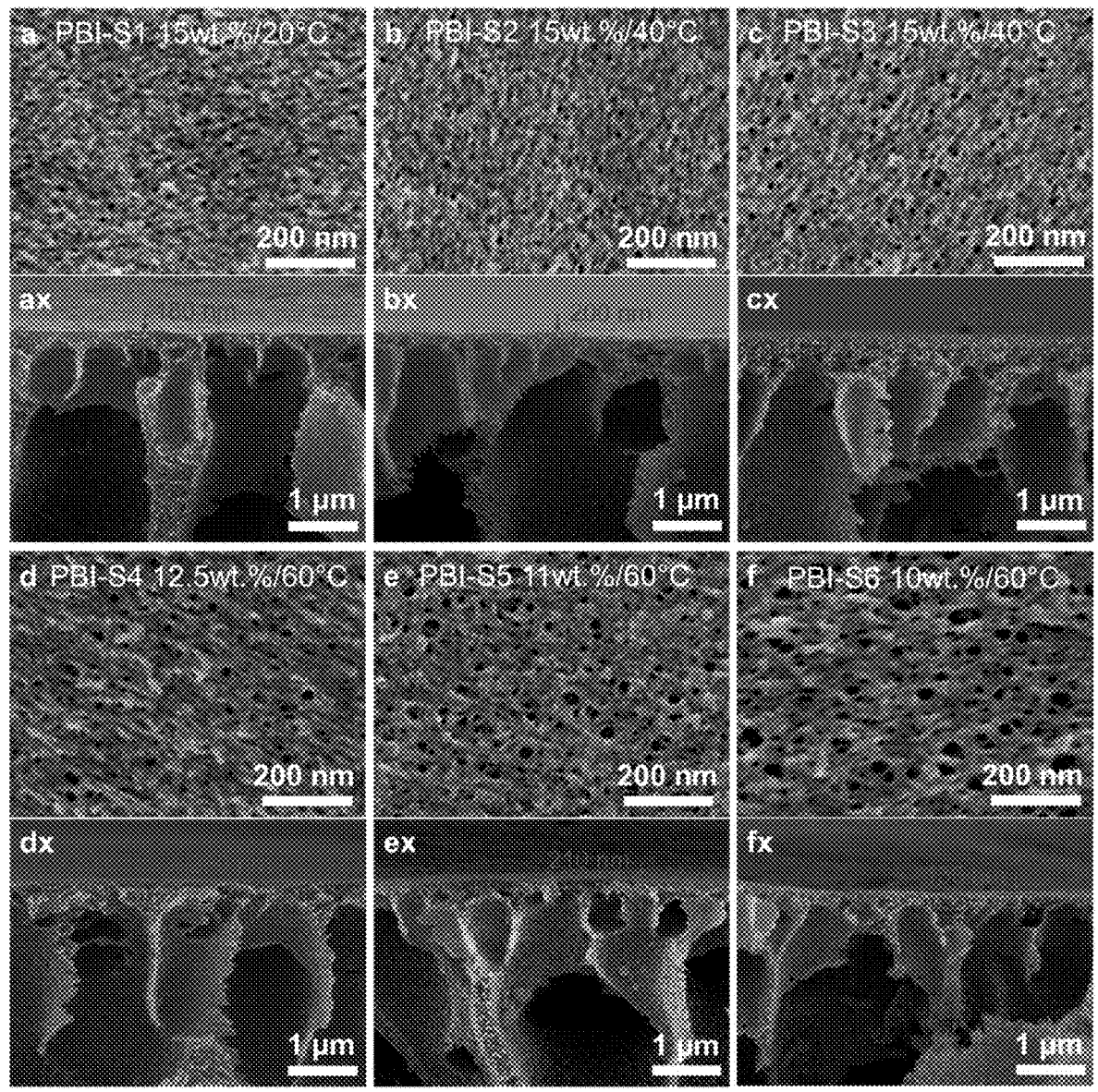
FIG. 3 Surface and cross-sectional SEM images of porous PBI membranes, respectively: (a, ax) PBI-S1, (b, bx) PBI-S2, (c, cx) PBI-S3, (d, dx) PBI-S4, (e, ex) PBI-S5, and (f, fx) PBI-S6. The notations denote the used PBI concentration in wt. % and the water bath temperature in ° C., respectively.
Figure 4:
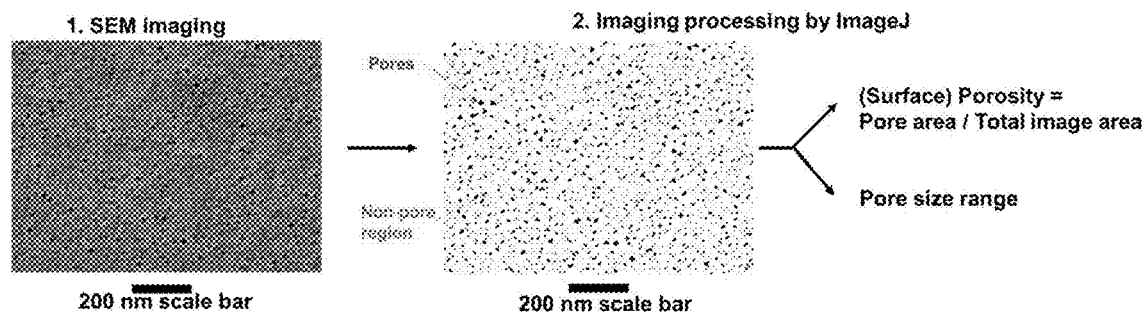
FIG. 4 Schematic illustration of surface pore size and porosity determination via integrating the SEM imaging technique with an imaging processing by ImageJ.

Discussion on surface pore morphology and gas permeance: The higher permeance and higher surface porosity with sub-50 nm pores are preferred in a high-performance porous membrane support. As displayed in FIGS. 3a-f, PBI membranes with tunable pore structure were achieved by varying PBI solution concentration and water quench bath temperature. Surface pore size and porosity were determined by the SEM imaging processing method as described above. The porous PBI membranes show nano-size pores and a surface porosity as high as 20% as summarized in Table 1. FIGS. 3ax-fx present cross-sectional SEM micrographs of the PBI membranes at their near-surface region. They show a finger-like structure comprising a microporous skin layer and a macrovoid sublayer. Their microporous skin layer thickness (150-320 nm), measured as the distance from the top surface to the tip of a finger structure, is marked in the micrographs. The skin layer with fine surface pores can provide a smooth surface for thin film coating, and the pillar-like macrovoid walls in the sublayer offer major mechanical support. As summarized in Table 1, increasing water bath temperature from 20 to 60° C. increases membrane gas permeance, pore size, and surface porosity. Decreasing PBI concentration from 15 to 10 wt. % can further improve membrane gas permeance, pore size, and surface porosity. For example, PBI S3 membrane, prepared using a 15 wt. % PBI solution and a 60° C. water bath, showed 26 kGPU $CO_2$ permeance, pore diameter less than 18 nm, and 6.2% surface porosity. Using a diluted 10 wt. % PBI solution, the produced PBI S6 membrane exhibited 260 kGPU $CO_2$ permeance, pore diameter less than 42 nm, and 20% surface porosity. The PBI membranes are characterized by high-permeance, nano-sized pore, and high-porosity.

b. Solvent Resistance

The fabrication of TFC membranes primarily relies on solution-coating techniques, and the chemical stability of a porous support thus becomes an important parameter to be considered. We evaluated solvent resistance of the porous PBI membranes (e.g., PBI-S6) by monitoring changes of including hexane, ethanol, tetrahydrofuran (THF), chloroform, and acetone. Its gas permeance maintained at about 260 kGPU, demonstrating its excellent solvent resistance to the selected solvents. Although PAN-S was stable in hexane and ethanol, its gas permeance dropped after soaking in THF, chloroform, or acetone. Especially in acetone, PAN-S only managed to recover 46 out of 144 kGPU after the soaking treatment. The permeance drop in PAN-S was presumably caused by solvent swelling. Even though PAN cannot be dissolved by the selected solvents, it would be swollen by solvents and thus pore morphology might be changed after drying. As shown in FIG. 5b-c, PAN-S becomes less porous after soaking in acetone than its pristine state. This comparison proves the outstanding solvent resistance of the PBI porous membranes.

c. Thermal Stability

Figure 6:
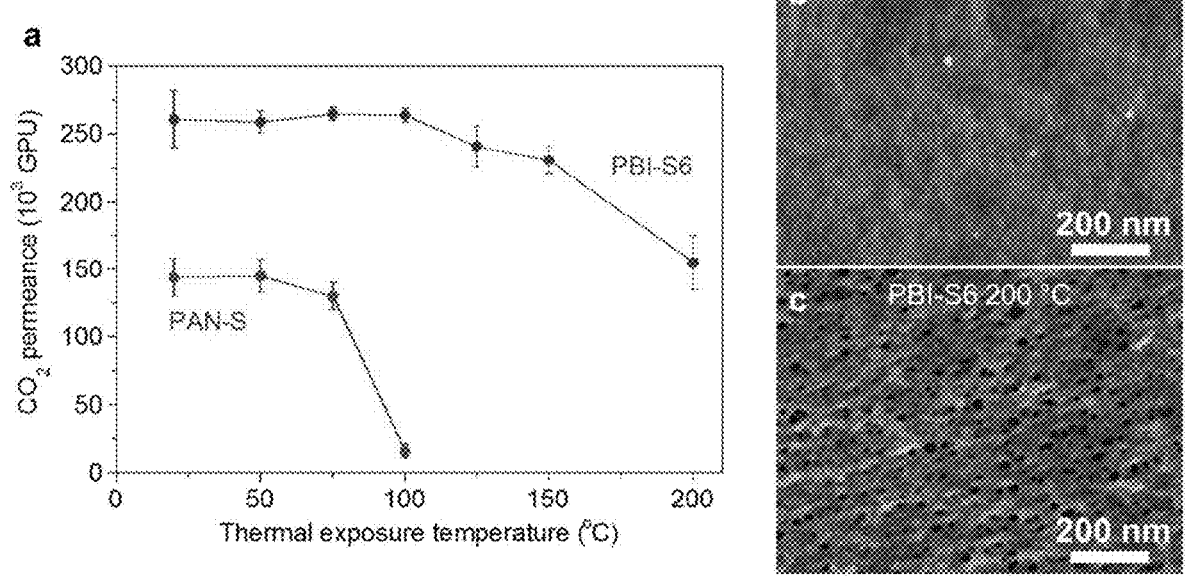
FIG. 6 (a) Effect of thermal exposure temperature on $CO_2$ permeance of PBI-S6 and PAN-S. Surface morphology of porous supports after thermal exposure: (b) PAN-S at 100° C. and (c) PBI-S6 at 200° C.

Thermal treatment is often employed to evaporate solvents and promote thin film formation in TFC membrane fabrication. Especially in the large-scale production involving a continuous roll-to-roll process, heating units must be used to rapidly dry or cure the membranes. We examined the thermal stability of the PBI support by studying the dependence of gas permeance on thermal exposure temperature. Prior to gas permeance measurement, each sample was baked in an oven at a given temperature for 1 hour. This process simulates a potential thermal heat treatment used to remove solvents during the thin film coating. FIG. 6a shows that $CO_2$ permeance of PBI-S6 was maintained at 260 kGPU from 23 to 100° C., whereas PAN-S can only withstand thermal exposure up to 75° C., and it almost lost its porous feature at 100° C. (FIG. 6b) with a low $CO_2$ permeance of 5 kGPU. Although gas permeance of PBI-S6 declined at 125-200° C., it still presented 155 kGPU after thermal annealing at 200° C. FIG. 6c evidences thermal treatment at 200° C. shrank pore size to 8-37 nm on PBI-S6 and decreased surface to about 12%, thus leading to the drop in gas permeance. Nevertheless, the $CO_2$ permeance of PBI-S6 annealed at 200° C. was still higher than that (144 kGPU) of pristine PAN-S. This sought-after thermal stability also expands the porous PBI membrane's application to high-temperature membrane separations, for example, being a porous support for the TFC membranes used in the pre-combustion $CO_2$ capture ($H_2/CO_2$ separation) operated at 150° C. or above.

Example 2. Porous PBI Membranes as a Membrane Support for Two-Layer TFC Membranes Herein, we evaluated the porous PBI membranes' performance as a porous support in practical TFC membranes, that is, the capability of providing a suitable surface for the formation of defect-free thin films without introducing too much gas transport resistance. To examine the PBI membranes' supporting performance, a thin polydimethylsiloxane (PDMS) layer is applied on PBI-S6 to form a traditional two-layer TFC membrane. Rubbery PDMS is chosen as a coating material because it has been widely utilized in industrial gas and vapor separations, and more importantly, its thin film permeance is stable with time. PBI-S6 is selected for this demonstration because it shows the highest gas permeance and surface porosity among the invented membranes.

Membrane fabrication and characterizations: PDMS-based two-layer TFC membranes were fabricated on a PBI-S6 support using a knife casting method. First, a PBI-S6 support of 5.0×7.5 cm was taped on a glass substrate and immersed in water for 5 minutes. This water pre-wetting process is to reduce PDMS solution pore penetration during the coating. Second, excess water on the support membrane surface was gently removed using flowing nitrogen, immediately followed by applying a PDMS/hexane solution using a casting knife with a blade clearance 50 µm above the support membrane. Finally, the PDMS composite membrane was cross-linked and dried in an oven at 100° C. for 1 hour. The concentration of PDMS prepolymer in hexane was varied from 0.5, 1.0, to 2.0 wt. % to achieve PDMS layers with different thicknesses. The PDMS prepolymer comprises 86.2 wt. % vinyl-PDMS (Dehesive® 944), 8.6 wt. % Crosslinker V24, and 5.2 wt. % Catalyst OL. The resulting PDMS layer thickness was determined by cross-sectional SEM, performed with a FEI Quanta™ 600F scanning electron microscope (Thermo Fisher Scientific, OR, USA). Pure-gas permeances of $CO_2$ and $N_2$ across the PDMS/PBI-S6 two-layer TFC membranes were determined using a constant pressure/variable volume method at 25° C. as described in Gas Permeance Measurement of Glossary.

Figure 7:
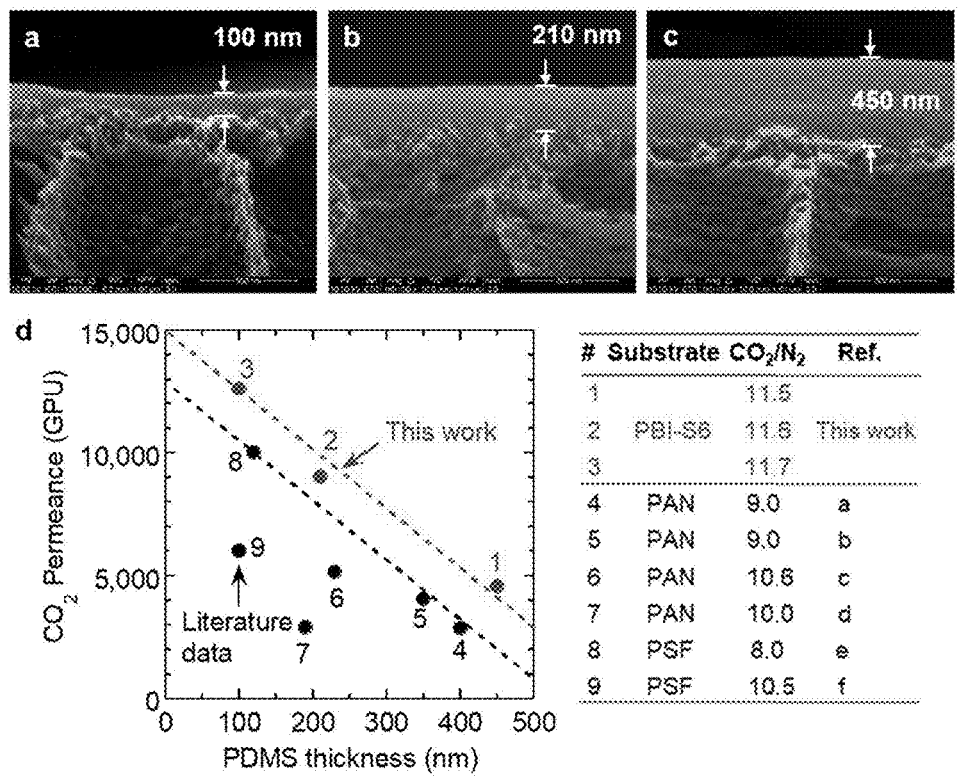
FIG. 7 Cross-sectional SEM micrographs of PDMS/PBI-S6 TFC membranes fabricated using PDMS solution at concentration of (a) 0.5, (b) 1.0 and (c) 2.0%, respectively. (d) Comparison of $CO_2$/$N_2$ separation permeance of PDMS/PBI-S6 two-layer TFC membranes with the most permeable PDMS TFC membranes reported in the literature (Refs a-f). The dash lines are to guide the eye. PSF: polysulfone and PAN: polyacrylonitrile.

Results and discussion on PDMS/PBI two-layer TFC membranes: Using a traditional and scalable knife casting method, 100 to 450 nm thick defect-free PDMS thin films (FIGS. 7a-c), can be easily prepared on top of PBI-S6, demonstrating that the surface morphology of the porous PBI membrane is suitable for producing thin films as thin as 100 nm. FIG. 7d compares $CO_2$ permeance of the PDMS/PBI-S6 TFC membranes with state-of-the-art PDMS membranes supported by commercial PAN or PSF supports {Refs: (a) *Nanoscale*, 8 (2016) 8312; (b) *J. Membr. Sci.*, 499 (2016) 191; (c) *J. Membr. Sci.*, 541 (2017) 367; (d) *Energy Environ. Sci.*, 9 (2016) 434; (e) Sep. Purif. Technol., 239 (2020) 116580; (f) ACS Appl. Mater. Interfaces, 7 (2015) 15481.}. At a similar PDMS thickness, PBI-S6 supported membranes provided much higher permeance than that of PAN and PSF supported ones, proving that PBI-S6 imposed less gas transport resistance and thus is a much better membrane support than those commercial PAN and PSF supports. It is also noticeable that our 100 nm-thick PDMS/PBI-S6 membrane showed the highest $CO_2$ permeance (i.e., 12600 GPU) among the reported PDMS composite membranes.

Figure 8:
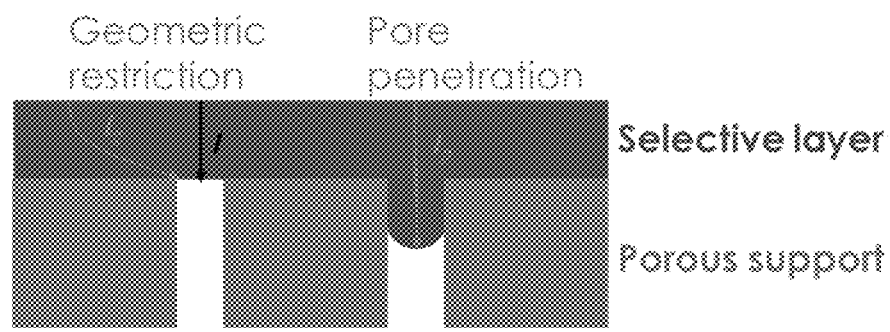
FIG. 8: Schematic illustrations of a gas separation composite membrane comprising of a porous support and a selective layer with thickness of l. The composite membrane suffers a geometric restriction and pore penetration effect that increase gas diffusion pathway distance.

As shown in FIG. 8, a composite membrane is made of a porous support overlaid with a selective layer. The porous support would inevitably impose additional gas transport resistance due to a geometric restriction and pore penetration effect. The geometric restriction occurs because gas can only diffuse through the selective layer where a pore is present. A limited pore accessibility would increase gas diffusion pathway distance and thus the gas transport resistance. The pore penetration happens because dilute coating solution tends to intrude into the support pores before it solidifies as a thin film. Compared to the nominal thickness (l), the gas diffusion pathway through a plugged pore ($l_p$) becomes longer, leading to an increase in gas transport resistance. The effect of a porous support on gas permeance through a composite membrane can be characterized by membrane permeance efficiency ($\beta_A$):

$$\beta_A = \left(\frac{P}{l}\right)_{exp} / \left(\frac{P}{l}\right)_{ideal}$$

where $(P_A/l)_{exp}$ is the experimentally determined gas permeance and $(P_A/l)_{ideal}$ is the ideal permeance without any restrictions from the support membrane. A higher $\beta_A$ value indicates the porous support impose less gas transport resistance. Table 2 compares $CO_2$ permeance efficiency value ($\beta_{CO2}$) of the PDMS/PBI-S6 TFC membranes in this invention with state-of-the-art composite membranes. The selective layer is made thinner and thinner to improve the overall gas permeance, leading to a decrease in the $\beta_A$ value. This can be ascribed to an amplified geometric restriction on a thinner selective layer: a typical porous support has surface porosity no more than 20%, so gas penetrants primarily enter into the selective layer away from the pore region (FIG. 8); the ratio of gas diffusion pathway distance to selective layer thickness ($l_g/l$) increases significantly as decreasing the thickness l, resulting in a relatively higher transport resistance. Consequently, our PDMS/PBI-S6 TFC membranes presented $\beta_{CO2}$ value of 64.3% at 450 nm but then decreased to 39.4% at 100 nm (Table 2). Nevertheless, the PDMS/PBI-S6 TFCs exhibit much higher $\beta_{CO2}$ values than those PAN and PSF supports based TFC membranes at any thickness ranges. For example, at 100-210 nm, our TFC has $\beta_{CO2}$ values varying from 39.4-59.1%, compared to 14.4-37.5% observed on the reported TFCs in the literature. This comparison reconfirms that our PBI supports outperform those popular commercial porous supports, by approximately doubling the permeance efficiency in most cases.

TABLE 2

Fabrication and test conditions, gas separation properties, and $CO_2$ permeance efficiency ($\beta_{CO2}$) of PDMS-based two-layer TFC membranes.

| | Substrate | Coating technique | PDMS (l, nm) | $CO_2$ perm. (GPU) | $CO_2/N_2$ select. | Test temp. (° C.) | Feed pressure (bar) | $\beta_{CO2}$ (%) | Ref. |
|---|---|---|---|---|---|---|---|---|---|
| 1 | PBI-S6 | Knife casting | 450 | 4570 | 11.7 | 25 | 1.0 | 64.3 | This |
| 2 | | | 210 | 9000 | 11.6 | 25 | 1.0 | 59.1 | work |
| 3 | | | 100 | 12600 | 11.5 | 25 | 1.0 | 39.4 | |
| 4 | PAN | Spin coating | 400 | 2860 | 9.0 | 35 | 3.5 | 30.2 | a |
| 5 | PAN | Spin coating | 350 | 4050 | 9.0 | 35 | 3.5 | 37.3 | b |
| 6 | PAN | Dip coating | 230 | 5140 | 10.6 | 25 | 2.0 | 36.9 | c |
| 7 | PAN | Spin coating | 190 | 2880 | 10.0 | 35 | 3.4 | 14.4 | d |
| 8 | PSF | Knife casting | 120 | 10000 | 10.5 | 25 | 0.2 | 37.5 | e |
| 9 | PSF | Knife casting | 100 | 6000 | 8.0 | 25 | 1.0 | 18.8 | f |

Refs:
a *Nanoscale*, 8 (2016) 8312;
b *J. Membr. Sci.*, 499 (2016) 191;
c *J. Membr. Sci.*, 541 (2017) 367;
d *Energy Environ. Sci.*, 9 (2016) 434;
e *Sep. Purif. Technol.*, 239 (2020) 116580;
f *ACS Appl. Mater. Interfaces*, 7 (2015) 15481.

Example 3. Porous PBI Membranes as a Membrane Support for Multi-Layer TFC Membranes Industrial membranes often use multi-layer TFC membranes with an intermediate gutter layer (<1000 nm) between the selective layer and the porous membrane support to achieve high permeance for gas separation. (Kattula et al., Designing ultrathin film composite membranes: the impact of a gutter layer. *Scientific Report* 5, 15016 (2015)) A gutter layer plays at least two roles in achieving high-performance TFC membranes when employed. First, it prevents dilute coating solutions of the selective layer material from penetrating into the bottom porous support. The pore penetration of low-permeability selective layer material would block support pores and significantly increase mass transfer resistance. Second, it provides a smoother surface than the bare porous support. A smooth surface forms a continuous defect-free ultra-thin selective layer to boost membrane permeance. In the meantime, a gutter layer would inevitably impose additional mass transfer resistance to the resulting TFC membrane, so favorable gutter layers must be formed from highly permeable materials to avoid any significant transport resistance. PDMS has been the most used gutter layer material due to its high gas permeability and stable thin-film performance, and thereby it is employed as the gutter layer material in this example. We evaluated the porous PBI membranes' performance as a porous support in a multi-layer TFC membrane for $CO_2/N_2$ separation (or post-combustion carbon capture). The selective layer of the multi-layer TFC membrane uses poly(ethylene oxide terephthalate)-poly(butylene terephthalate) because it is a widely-employed $CO_2$-selective membrane material and commercialized under the tradename of Polyactive™ by PolyVation BV, Netherlands.

Membrane fabrication and characterizations: To fabricate a Polyactive/PDMS/PBI-S6 multi-layer TFC membrane for $CO_2/N_2$ separation, a 100 nm-thick PDMS gutter layer was firstly coated onto a PBI-S6 membrane support by knife casting a 0.5% PDMS coating solution following the coating method described in Example 2. A 2×2 cm coupon cut from the resulting PDMS/PBI-S6 two-layer membrane was then mounted onto a glass disc with a diameter of 3.8 cm by taping the coupon's four edges. Afterwards, 0.25 mL Polyactive™ solution (0.5 wt. % in tetrahydrofuran solvent) was spin-coated (1000 rpm for 1 minute) on the PDMS/PBI-S6 two-layer structure. Finally, a Polyactive/PDMS/PBI-S6 multi-layer TFC membrane was obtained by drying the spin-coated sample at 50° C. under vacuum for 4 hours. The Polyactive layer thickness was determined as 30 nm by an Alpha-SE ellipsometer (J.A. Woollam Co., Lincoln, NE) and then confirmed by cross-sectional SEM characterization performed with a FEI Quanta™ 600F scanning electron microscope (Thermo Fisher Scientific, OR, USA). Pure-gas permeances of $CO_2$ and $N_2$ across the Polyactive/PDMS/PBI-S6 multi-layer TFC membranes were determined using a constant pressure/variable volume method at 25° C. as described in Gas Permeance Measurement of Glossary.

TABLE 3

Comparison of $CO_2/N_2$ separation permeance of Polyactive/PDMS/PBI-S6 multi-layer TFC membranes with the best-performing Polyactive-based multi-layer TFC membrane reported in the literature.

| Membrane support | Gutter layer | Selective layer thickness (nm) | $CO_2$ perm. (GPU) | $CO_2/N_2$ select. | Reference |
|---|---|---|---|---|---|
| PBI-S6 | PDMS | 30 | 3100 ± 200 | 41 ± 2 | This work |
| Commercial PAN | Metal-organic frameworks | 80 | 2100 | 33 | Liu et al. *ACS Nano* 12 (2018) 11591 |
| Customized PAN | PDMS | 80 | 1330 | 52 | Yave et al., *Nanotechnology* 21 (2010) 395301 |

TABLE 3-continued

Comparison of $CO_2/N_2$ separation permeance of Polyactive/PDMS/PBI-S6 multi-layer TFC membranes with the best-performing Polyactive-based multi-layer TFC membrane reported in the literature.

| Membrane support | Gutter layer | Selective layer thickness (nm) | $CO_2$ perm. (GPU) | $CO_2/N_2$ select. | Reference |
|---|---|---|---|---|---|
| Customized PAN | PDMS | 45 | 1780 | 60 | Yave et al., *Energy Environ. Sci.* 4 (2011) 4656 |

Figure 9:
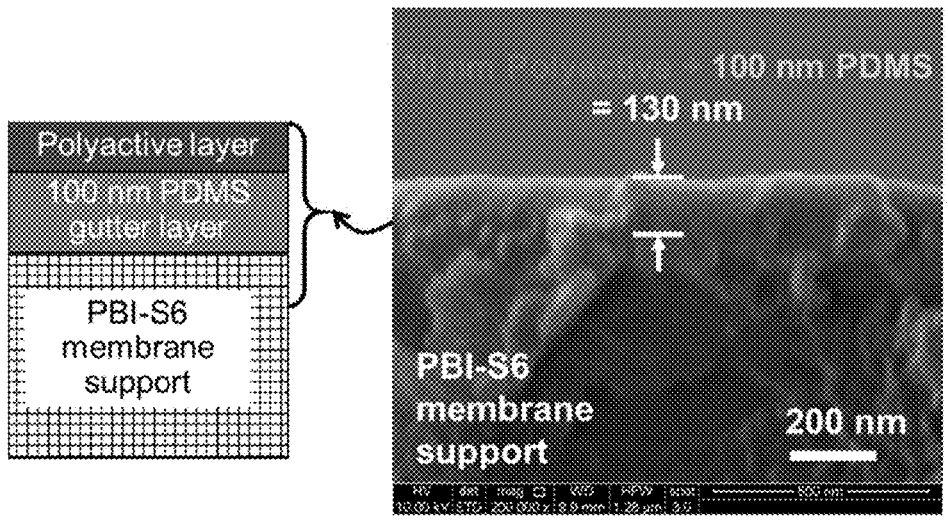
FIG. 9 Schematic illustrations and cross-sectional SEM image of a multi-layer TFC membrane comprised of a Polyactive selective layer, a PDMS gutter layer, and a PBI-S6 membrane support.
Figure 10:
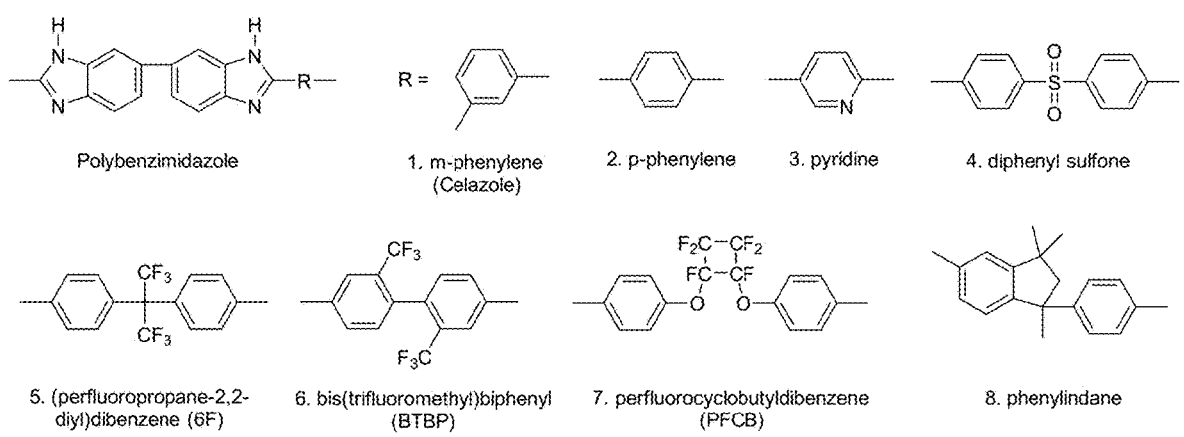
FIG. 10 Chemical structure of some polybenzimidazoles with different R groups that can be used in the invention. The R groups displayed from left to right: m-phenylene, pyridine, diphenyl sulfone, (perfluoropropane-2,2-diyl)dibenzene, bis(trifluoromethyl)biphenyl (BTBP), perfluorocyclobutyldibenzene (PFCB), and phenylindane.

Results and discussion on Polyactive/PDMS/PBI multi-layer TFC membranes: An ultrathin defect-free Polyactive layer was successfully fabricated on top of a PDMS gutter layer coated PBI-S6 membrane support. As shown in FIG. 9, a dense coating with a thickness of 130 nm deposited on the PBI-S6 membrane support. The dense coating comprises a 100 nm PDMS gutter layer and a 30 nm Polyactive selective layer as measured by cross-sectional SEM and optical ellipsometry. Gas separation performance of the resulting Polyactive/PDMS/PBI-S6 multi-layer TFC membranes was evaluated for $CO_2/N_2$ separation or post-combustion carbon capture. According to a recent technology economic analysis on the membrane $CO_2/N_2$ separation (Alex Zoelle et al., Performance and Cost Sensitivities for Post-Combustion Membrane Systems, 2018 NETL CO2 Capture Technology Project Review Meeting, accessed on Jun. 25, 2021, https://www.osti.gov/servlets/purl/1592464), the membrane process becomes profitable for post-combustion carbon capture when $CO_2$ permeance is greater than 1000 GPU. The cost of $CO_2/N_2$ separation (or carbon capture cost) significantly decreases as increasing $CO_2$ permeance in a permeance range of 1000-4000 GPU when $CO_2/N_2$ selectivity is maintained above 25. As summarized in Table 3, the Polayacitve/PDMS/PBI-S6 multi-layer TFC membranes exhibit an averaged $CO_2$ permeance of 3100±200 GPU and high $CO_2/N_2$ selectivity of 41±2. This obtained $CO_2$ permeance of 3100 GPU is 48% higher than the highest permeance (i.e., 2070 GPU) previously achieved for Polyactive-based multi-layer TFC membranes, as reported by Liu et al. in *ACS Nano* 12 (2018) 11591, suggesting the superior separation performance of the fabricated Polyactive/PDMS/PBI-S6 membranes. The membranes of this invention also show essentially higher $CO_2$ permeance than those (1330-1780 GPU) of the Polyactive-based multi-layer TFC membranes on PAN membrane supports coated with a PDMS gutter layer. (Yave et al., *Nanotechnology* 21 (2010) 395301 and Yave et al., *Energy & Environmental Science* 4 (2011) 4656). The high $CO_2$ permeance has been achieved for the multi-layer membranes of this example because ultrahigh-permeance PDMS gutter layer (i.e., a record-high $CO_2$ permeable of 12600 GPU as determined in Example 2) provides a smooth coating surface with no significant mass transfer resistance, while the formation of such a PDMS gutter layer can be ultimately ascribed to the use of the highly permeable PBI-S6 membrane support with nano-sized pores and high surface porosity.

TABLE 4

Physical properties of porous PBI membranes in this invention and the references

| Membrane description | $N_2$ permeance (1000 GPU) | Pore size (dia., nm) | Surface porosity (%) | Reference |
|---|---|---|---|---|
| NETL PBI-S6 | 300 ± 28 | <42 | 20 ± 2 | This invention |
| NETL PBI-S4 | 94 ± 8 | <25 | 8.6 ± 1.0 | This invention |
| Microporous PBI membrane | N/A | 200-700 | N/A | U.S. Pat. No. 5,091,087 |
| Microporous PBI membrane | 9.6-32.2 | 50-1000 | N/A | U.S. Pat. No. 6,623,639 U.S. Pat. No. 6,986,844 |
| Microporous PBI membrane | N/A | >100 | N/A | Takigawa et al., *Separation Science and Technology*, 27, 3, 325-339 (1992) |
| PBI porous support | 170 | ~100 | 21 | Weigelt et al., *Membranes* 2019, 9, 51 |
| PBI nanofiltration membrane | N/A | 0.696 | N/A | Wang et al., *Journal of Membrane Science* 281 (2006) 307-315 |
| PBI nanofiltration membrane | N/A | 0.67-0.70 | N/A | Tashvigh et al. *Journal of Membrane Science* 572 (2019) 580-587 |

What is claimed:

1. A porous PBI membrane, comprising:
a fabric layer;
a PBI layer bonded to the fabric layer;
and further characterizable by:
 wherein the PBI layer comprises a pore size of less than 50 nm, and a surface porosity of at least 8%; or
 wherein the PBI layer comprises finger-like pores observed from the cross-section under microscope, and wherein at least 50 vol % of the pores in the PBI layer have an aspect ratio of at least 2, wherein aspect ratio is defined as maximum length divided by average diameter of each pore, and where length is perpendicular to the surface of the fabric layer.

2. The porous PBI membrane of claim 1 wherein the PBI layer has a surface porosity of at least 5%.

3. The porous PBI membrane of claim 1 wherein the PBI layer has a solvent resistance such that, if soaked in chloroform, tetrahydrofuran, or acetone for 1 hour and then dried, the soaked and then dried PBI membrane comprises a gas permeance at least 90% its permeance measured before the solvent soaking.

4. The porous PBI membrane of claim 1 further comprising a $CO_2$ selective layer forming a composite membrane and wherein the composite membrane has a $CO_2$ permeance of at least 1000 GPU and a $CO_2/N_2$ selectivity of at least 8 at 25° C. and a feed pressure of 1 atm.

5. The porous PBI membrane of claim 1 further comprising a $CO_2$ selective layer forming a composite membrane, wherein the $CO_2$ selective layer has a thickness in the range of 100 to 500 nm and wherein the composite membrane has $\beta_{CO2}$ of at least 10%.

6. The porous PBI membrane of claim 1 comprising a $CO_2$ selective layer, wherein the $CO_2$ selective layer comprises poly(ethylene oxide terephthalate)-poly(butylene terephthalate).

7. The porous PBI membrane of claim 1 comprising a $CO_2$ selective layer, comprising a $CO_2$ permeance as a function of the thickness of the $CO_2$ selective layer of about 12.6 kGPU at a $CO_2$ selective layer thickness of 100 nm to about 5000 GPU at a $CO_2$ selective layer thickness of 450 nm or any value along a line between these points.

8. A porous PBI membrane-supported composite membrane or a composite membrane intermediate, comprising:
the porous PBI membrane of claim 1;
and a top layer coated on the PBI layer so that the porous PBI layer is sandwiched between the fabric layer and the top layer.

9. The porous PBI membrane supported-composite membrane or composite membrane intermediate of claim 8 wherein the top layer comprises polydimethylsiloxane attached to the PBI layer.

10. The porous PBI membrane of claim 1, wherein the PBI layer comprises PBI with an R group selected from the group consisting of p-phenylene, pyridine, diphenyl sulfone, hexafluoroisopropylidene, 2,2'-bis(trifluoromethyl)-4,4'-biphenyl, perfluorocyclobutyl, phenylindane, and combinations thereof.

11. The porous PBI membrane of claim 1, wherein the fabric layer is a non-woven fabric comprising a polyphenylene sulfide non-woven fabric.

12. The porous PBI membrane of claim 1, wherein the fabric layer is a non-woven fabric selected from polyester, polyethylene, polypropylene, or polyetherether ketone non-woven fabrics.

13. The porous PBI membrane of claim 1 wherein the PBI layer has a heat resistance such that the porous PBI membrane, if annealed to 200° C., comprises a $CO_2$ permeance of at least 150 kGPU.

14. The porous PBI membrane supported-composite membrane or composite membrane intermediate of claim 8 wherein the top layer comprises at least one material showing selective permeability to one gas over a different gas.

15. The porous PBI membrane supported-composite membrane or composite membrane intermediate of claim 8 wherein the top layer is polymeric.

16. The porous PBI membrane supported-composite membrane or composite membrane intermediate of claim 8 wherein the top layer comprises PDMS or polymer/inorganic hybrid materials.

17. The porous PBI membrane supported-composite membrane or composite membrane intermediate of claim 8 wherein the top layer comprises inorganic materials.

18. The porous PBI membrane supported-composite membrane or composite membrane intermediate of claim 8 wherein the top layer comprises graphene oxides, metal-organic frameworks, and molybdenum disulfide, or combinations thereof.

19. The porous PBI membrane of claim 1 wherein the porous PBI membrane is characterizable by a $CO_2$ permeance in the range of 20 to 400 kGPU, or a $N_2$ permeance in the range of 20 to 500 kGPU, or a gas ($CO_2$ or $N_2$) permeance of at least 200 kGPU.

20. A porous PBI membrane, comprising:
a fabric layer;
a PBI layer bonded to the fabric layer;
and further characterizable by:
wherein the PBI layer comprises finger-like pores observed from a cross-section under microscope, and wherein at least 50 vol % of the pores in the PBI layer have an aspect ratio of at least 2; and,
wherein aspect ratio is defined as maximum length divided by average diameter of each pore, and where length is perpendicular to the surface of the fabric layer, wherein the PBI layer has a solvent resistance such that, if soaked in chloroform, tetrahydrofuran, or acetone for 1 hour, the PBI layer, after soaking and drying, comprises a gas permeance at least 90% of its permeance measured before the solvent soaking.

* * * * *